United States Patent
Funk et al.

(10) Patent No.: US 7,480,238 B2
(45) Date of Patent: Jan. 20, 2009

(54) DYNAMIC PACKET TRAINING

(75) Inventors: Mark Robert Funk, Mantorville, MN (US); Christopher William Gaedke, Rochester, MN (US); Travis William Haasch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/106,011

(22) Filed: Apr. 14, 2005

(65) Prior Publication Data

US 2006/0233118 A1 Oct. 19, 2006

(51) Int. Cl.
H04L 12/26 (2006.01)
(52) U.S. Cl. ....................................................... 370/229
(58) Field of Classification Search ........................ None
See application file for complete search history.

(56) References Cited

U.S. PATENT DOCUMENTS

| | | | |
|---|---|---|---|
| 5,237,675 A | 8/1993 | Hannon, Jr. | |
| 5,729,228 A | 3/1998 | Franaszek et al. | |
| 5,761,536 A | 6/1998 | Franaszek | |
| 5,864,859 A | 1/1999 | Franaszek | |
| 6,000,009 A | 12/1999 | Brady | |
| 6,092,171 A | 7/2000 | Relph | |
| 6,298,070 B1 * | 10/2001 | Carlson et al. | 370/465 |
| 6,535,238 B1 | 3/2003 | Kressin | |
| 6,564,305 B1 | 5/2003 | Moore | |
| 6,681,305 B1 | 1/2004 | Franke et al. | |
| 6,738,371 B1 | 5/2004 | Ayres | |
| 6,877,081 B2 | 4/2005 | Herger et al. | |
| 7,277,384 B1 * | 10/2007 | Chan et al. | 370/230 |
| 2002/0145974 A1 * | 10/2002 | Saidi et al. | 370/230 |
| 2003/0210701 A1 * | 11/2003 | Saiki et al. | 370/258 |
| 2006/0215579 A1 * | 9/2006 | Nadeau et al. | 370/254 |
| 2007/0258414 A1 * | 11/2007 | Cheng et al. | 370/338 |

* cited by examiner

*Primary Examiner*—Hassan Kizou
*Assistant Examiner*—Joshua Smith
(74) *Attorney, Agent, or Firm*—Martin & Associates, LLC; Derek P. Martin

(57) ABSTRACT

A packet control mechanism for a computer data system that dynamically adjusts packet training depending on the utilization load on the processor. The dynamic adjustment of packet training can be to enable and disable packet training, or adjust the number of packets in the packet train. In preferred embodiments, the computer data system includes a processor utilization mechanism that indicates a load on a processor. When the packet control mechanism determines the load on the processor is above a threshold limit, the packet control mechanism reduces the processor load by compressing the packets into the packet train. The compressing of the packets is stopped or reduced when the processor load is below a threshold in order to increase the data throughput on the network interface.

1 Claim, 5 Drawing Sheets

DYNAMIC PACKET TRAINING

BACKGROUND OF THE INVENTION

1. Technical Field

This invention generally relates to data processing and communications, and more specifically relates to a method and apparatus for dynamically transmitting data packets in a packet train.

2. Background Art

Computer systems communicate with each other over computer networks. Such networks include multiple nodes, which are typically computers, that may be distributed over vast distances and connected by communications links. Nodes in the computer network communicate with each other using data packets sent over the communication links. The data packets are the basic units of information transfer. A data packet contains data surrounded by control and routing information supplied by the various nodes.

Sending, receiving, and processing of packets have an overhead, or associated cost. That is, it takes time for the central processing unit (CPU) at a node to receive a packet, to examine the packet's control information, and to determine the next action. One way to reduce the packet overhead is a method called packet training. Packet training consolidates individual packets into a group, called a train, so that a node can process the entire train of packets at once. The term "train" is in reference to a train of railroad cars. The packets are formed into a group of sequential packets like a line of railroad cars or a train. Processing a train of packets has less overhead, and thus better performance, than processing each packet individually.

In a typical training method, a node will accumulate packets until the train reaches a fixed target-length. Then the node will process or retransmit the entire packet train at once. In order to ensure that the accumulated packets are eventually handled since the packet arrival rate at the node is unpredictable, the method will start a timer when the node receives the train's first packet. When the timer expires, the node will end the train and process it even if train has not reached its target length. This training method works well in times of heavy packet-traffic because the timer never expires. But in times of light packet-traffic, the packets that the node accumulates experience poor performance while waiting in vain for additional packets to arrive, and the ultimate timer expiration introduces additional processing overhead.

In another prior art packet training method, described in U.S. Pat. No. 5,859,853 to David Glen Carlson and incorporated herein by reference, the system dynamically adjusts the number of packets sent in a train from a node to reflect the rate-of-packets arriving at a node in a network. A packet controller determines the optimum train-length, that is the optimum number-of-packets to send in a train. The node also has a timer interval, which is the maximum time-to-wait before sending the next train. The packet controller samples the packet arrival-rate and calculates the elapsed time to receive a number-of-packets in a train. This elapsed time is referred to as a sampling interval. The packet controller calibrates the optimum train-length when the sampling interval changes significantly from the historic sampling-interval. This method provides dynamic training of packets but does not efficiently handle message latency, particularly for burst mode communication traffic in a low CPU utilization environment.

Packet training can save a significant amount of CPU load in a heavy communications workload environment. However, packet training can have a detrimental affect on the latency of messages sent over the network. When a message is sent with packet training, the message may be delayed while a packet train is being assembled. Thus there is a tradeoff between CPU load and communication latency when using packet training. Packet training decreases the load on the CPU but may increase the time for a message to be sent over the network due to the delay in building a train of packets. Without a way to optimize the tradeoff between CPU loading and network latency, the computer industry will continue to suffer from sub-optimum performance from a packet data network.

DISCLOSURE OF INVENTION

According to the preferred embodiments, a computer data system includes a packet control mechanism that dynamically adjusts packet training depending on the utilization load on the processor. The dynamic adjustment of packet training can be to enable and disable packet training, or adjust the number of packets in the packet train. In preferred embodiments, the computer data system includes a processor utilization mechanism that indicates a load on a processor. When the packet control mechanism determines the load on the processor is above a threshold limit, the packet control mechanism reduces the processor load by processing the packets into a packet train. The training of the packets is stopped or reduced when the processor load is below a threshold in order to increase the data throughput on the network interface.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to dynamic packet training in a data packet network depending on the loading of the CPU. The Overview Section immediately below is intended to provide an introductory explanation of pack training operations and history for individuals who need additional background in this area. Those who are skilled in the art may wish to skip this section and begin with the Detailed Description section instead.

Overview

Computer networks typically have multiple nodes connected by communications links, such as telephone networks. Each node typically includes a processing element, which processes data, and a communications-control unit, which controls the transmission and reception of data in the network across the communications link. The processing element can include one or more processors and memory.

Nodes communicate with each other using packets, which are the basic units of information transfer. A packet contains data surrounded by control and routing information supplied by the various nodes in the network. A message from one node to another may be sent via a single packet, or the node can break the message up into several shorter packets with each packet containing a portion of the message. The communications-control unit at a node receives a packet from the communications link and sends the packet to the node's processing element for processing. Likewise, a node's processing element sends a packet to the node's communications-control unit, which transmits the packet across the network.

Figure 1:
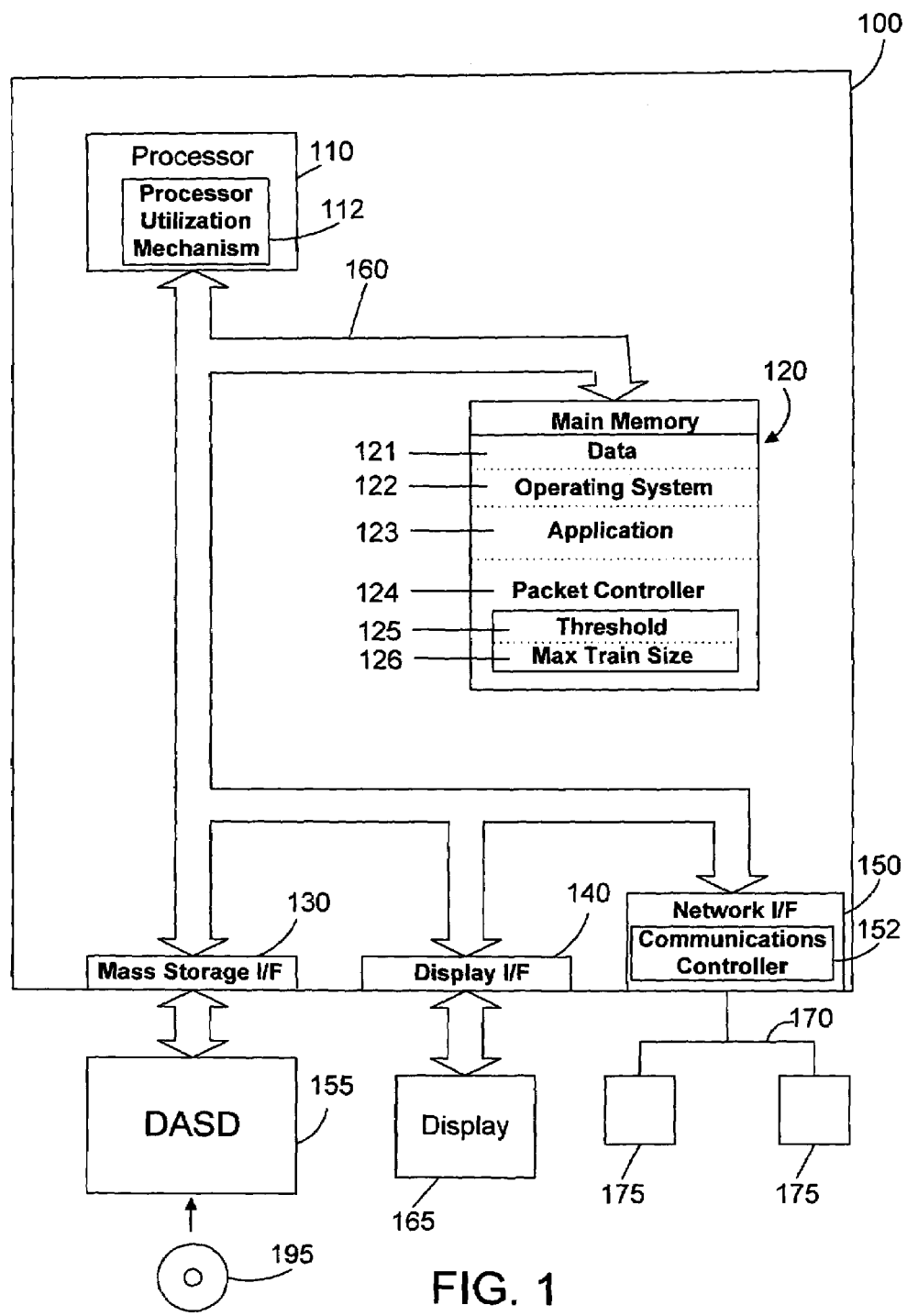
FIG. 1 is a block diagram of a computer system according a preferred embodiment.
Figure 3:
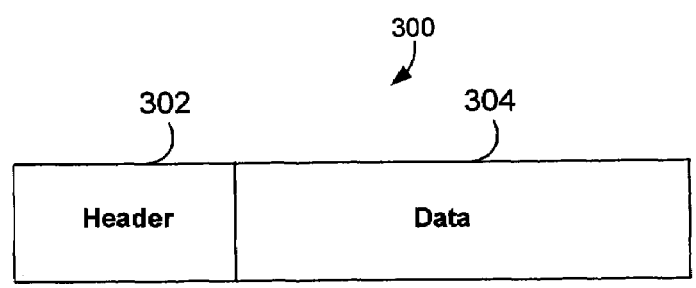
FIG. 3 depicts a data structure of an example packet, in accordance with the prior art.

Referring to FIG. 3, the data structure for a typical packet 300 is depicted, which includes header section 302 and data section 304. Header section 302 contains control information that encapsulates data 304. For example, header section 302 might contain protocol, session, source, or destination information used for routing packet 300 over network 170 (FIG. 1). Data section 304 could contain electronic mail, files, documents, or any other information desired to be communicated over network 170. Data section 304 could also contain another entire packet, including header and data sections.

Processing of packets has an overhead, or cost, associated with it. That is, it takes time to receive a packet at a node, to examine the packet's control information, and to determine what to do next with the packet. One way to reduce the packet overhead is to use a method called packet-training. Packet-training consolidates individual packets into a group, called a train, which reduces the overhead when compared to processing the same number of packets individually because a node can process the entire train of packets at once.

Figure 4:
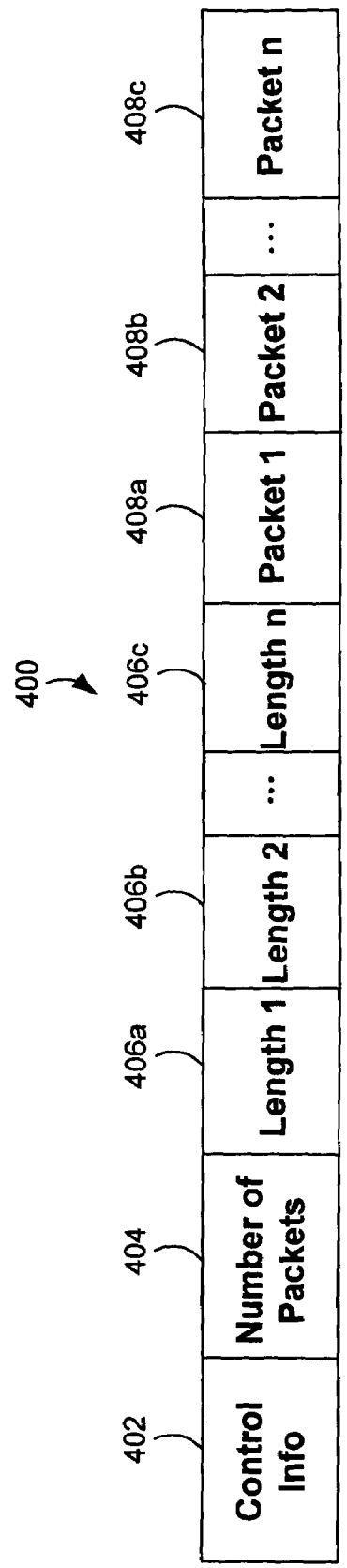
FIG. 4 depicts a data structure of an example packet train, in accordance with the prior art.

Referring to FIG. 4, a data structure example of a packet train 400, represents both the prior art and the packet train structure used by the preferred embodiments. Packet train 400 contains control information 402, the number of packets 404, a number of lengths 406 (length 406a, length 406b and so forth to length 406c), and a number of packets 408 (packet 408a, packet 408b and so forth to packet 408c). Control information 402 can specify, among other things, that the information that follows is part of a packet train. Number of packets 404 indicates how many packets are in the train. In this example, there are "n" packets in the train. Length l to length n are the lengths of packet l to packet n, respectively. Each packet 408a to packet 408c can contain header and data, as shown in FIG. 3. Packet train 400 is transferred between nodes as one unit.

DETAILED DESCRIPTION

Preferred embodiments illustrate a computer data system that dynamically adjusts packet training for network communication traffic on a network node depending on the processor loading. The network could have computer systems as its nodes, or the network could have processors in a multi-processor system as its nodes, or the network could be a combination of processors and computer systems. In the preferred embodiment, a node has a packet controller that dynamically enables and disables packet training. A suitable computer system is described below.

Referring to FIG. 1, a computer system 100 is shown in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor (central processing unit or CPU) 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Main memory 120 in accordance with the preferred embodiments contains data 121, an operating system 122, an application 123 and a packet controller 124. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. The application 123 is any application software program operating in the system that processes data 121. The packet controller 124 operates in conjunction with the communications controller 152 in the network interface 150 to dynamically adjust the packet compression as described further below. Packet controller 124 includes one or more thresholds 125 for comparing to the utilization level of the processor, and one or more maximum train sizes 126 for setting the maximum number of packets in a packet train. The thresholds 125 and maximum train sizes 126 are described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, application 123, and the packet controller 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100. Thus, while in FIG. 1, the application 123, and the packet controller 124 are all shown to reside in the main memory 120 of computer system 100, in actual implementation these software components may reside in separate machines and communicate over network 170.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Network 170 may include a plurality of networks, such as local area networks, each of which includes a plurality of individual computers such as the computer 100 described above. Further the computers may be implemented utilizing any suitable computer, such as the PS/2 computer, AS/400 computer, or a RISC System/6000 computer, which are products of IBM Corporation located in Annonk, N.Y. "PS/2", "AS/400", and "RISC System/6000" are trademarks of IBM Corporation. A plurality of intelligent work stations (IWS) (not shown) coupled to a processor may also be utilized in such a network. Network 170 may also may include mainframe computers, which may be coupled to network 170 by means of a suitable communications link. A mainframe computer may be implemented by utilizing an ESA/370 computer, an ESA/390 computer, or an AS/400 computer available from IBM Corporation. "ESA/370", "ESA/390", and "AS/400" are trademarks of IBM Corporation.

Figure 2:
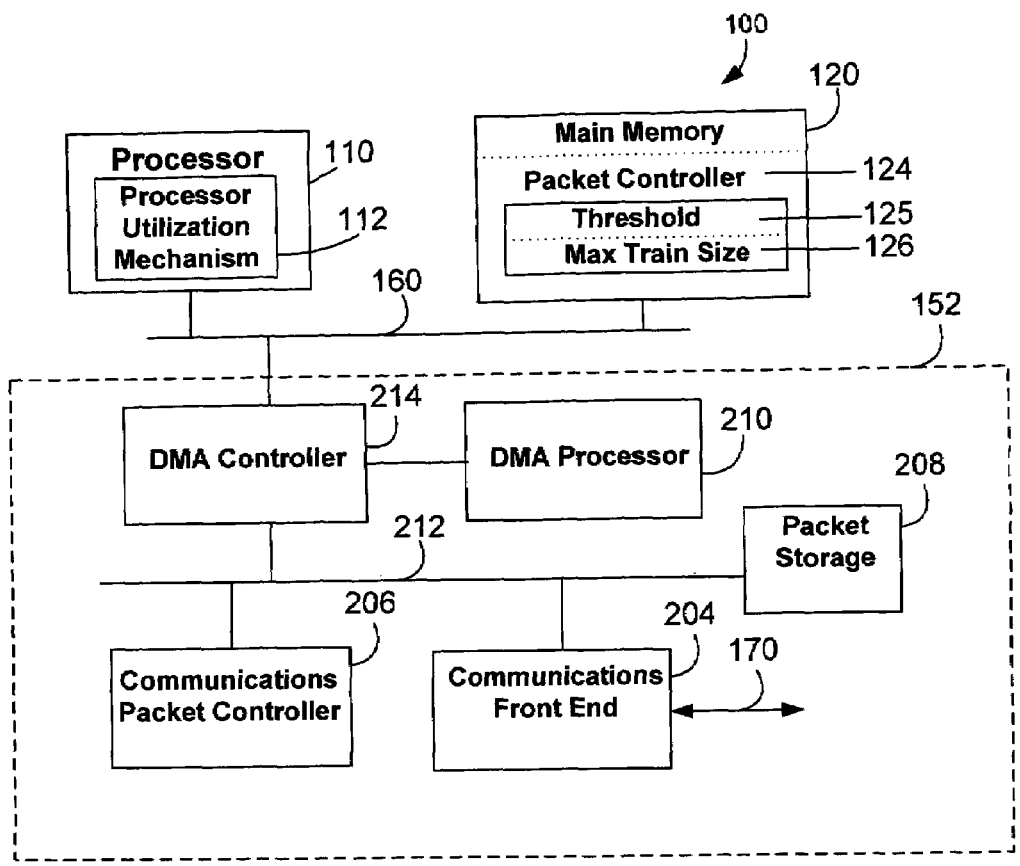
FIG. 2 is a more detailed block diagram of the computer system in FIG. 1.

Referring to FIG. 2, a more detailed schematic representation of computer system 100 is shown, which may be used for training packets according to preferred embodiments. Computer system 100 could be implemented in any of the computers on the network 170 as described above, or in a gateway server or mainframe computer. Computer system 100 can contain both hardware and software to implement the packet control features described herein.

Computer system 100 contains communications controller 152 connected to processor 110 and main memory 120 via system bus 160. Computer system 100 includes a processor utilization mechanism 112 capable of determining the level of utilization of the processor. Processor utilization mechanism 112 can be implemented in hardware or software. In a preferred embodiment, processor utilization mechanism 112 is implemented as an API call to the operating system that is supported by hardware in the processor that determines the ratio of the run cycles to the total number of cycles. The utilization mechanism could use any manner of processor metric to determine processor utilization or processor loading such as wait state tasks divided by total cycles, or other suitable metric.

Main memory 120 contains packet controller 124, which contains instructions capable of being executed by processor 110. In the alternative, packet controller 124 could be implemented by control circuitry through the use of logic gates, programmable logic devices, or other hardware components in lieu of a processor-based system. Packet controller 124 performs the packet-training method described herein below. Packet controller 124 includes one or more thresholds 125 for comparing to the utilization level of the processor. The thresholds are preferably selectable by the user or system programmer with an appropriate interface and stored in a memory area of the packet controller 124. For example, the thresholds may be set as part of the process to change TCP attributes with an appropriate request to the operating system 122 (FIG. 1).

In preferred embodiments, the packet controller 124 also includes one or more maximum train sizes 126 for setting the maximum number of packets in a packet train. Table 1 below shows an illustrative example of thresholds and associated maximum train size 126, which specifies the maximum number of packets in a packet train. For a threshold of 30% utilization, a maximum train size of 0 is set, indicating that packet training is disabled. For a threshold of 50% utilization, a maximum train size of 50 is set (a moderate size of packet train). For a threshold of 90% utilization, a maximum train size of 100 is set (a large size of packet train or the maximum sized packet train). The maximum train size is the size is the number of packets that are accumulated before sending the packet train. The maximum train size and the invention herein can also be combined with the prior art method of a timer to send out a packet train after a selected amount of time. The listed thresholds and associated packet train sizes are for illustration only. Any suitable number of thresholds could be used with an associated packet train size to get a desired performance tradeoff.

TABLE 1

| | Threshold | | |
|---|---|---|---|
| | 30 | 50 | 90 |
| Max Train Size | 0 | 50 | 100 (or maximum) |

Referring again to FIG. 2, communications controller 152 contains communications front-end 204, communications packet-controller 206, packet storage 208, and DMA (Direct Memory Access) controller 214, all connected via communications bus 212. DMA controller 214 is connected to DMA processor 210. Communications front-end 204 is connected to network 170, contains the circuitry for transmitting and receiving packets across network 170, and is employed to communicate with other nodes coupled to network 170.

When a packet is received by communications front end 204 from network 170, the packet is examined by communications packet-controller 206 and stored in packet storage 208 before being sent to DMA processor 210. DMA processor 210 controls DMA controller 214. DMA controller 214 receives packets from communications bus 212 and sends the packets to processor 110 through system bus 160. The packets then are processed by packet controller 124 and stored in host memory 120. When host processor 110 desires to send packets to network 170, it transmits the packets from host memory 120 to packet storage 208 using DMA controller 214 and DMA processor 210. Communications packet controller 206 then uses communications front-end 204 to transmit the packets from packet storage 208 across communications link 212 to network 170.

Although a specific hardware configuration is shown in FIG. 2, a preferred embodiment of the present invention can apply to any hardware configuration that allows the training of packets, regardless of whether the hardware configuration is a complicated, multi-user computing apparatus, a single-user work station, or a network appliance that does not have non-volatile storage of its own.

Figure 5:
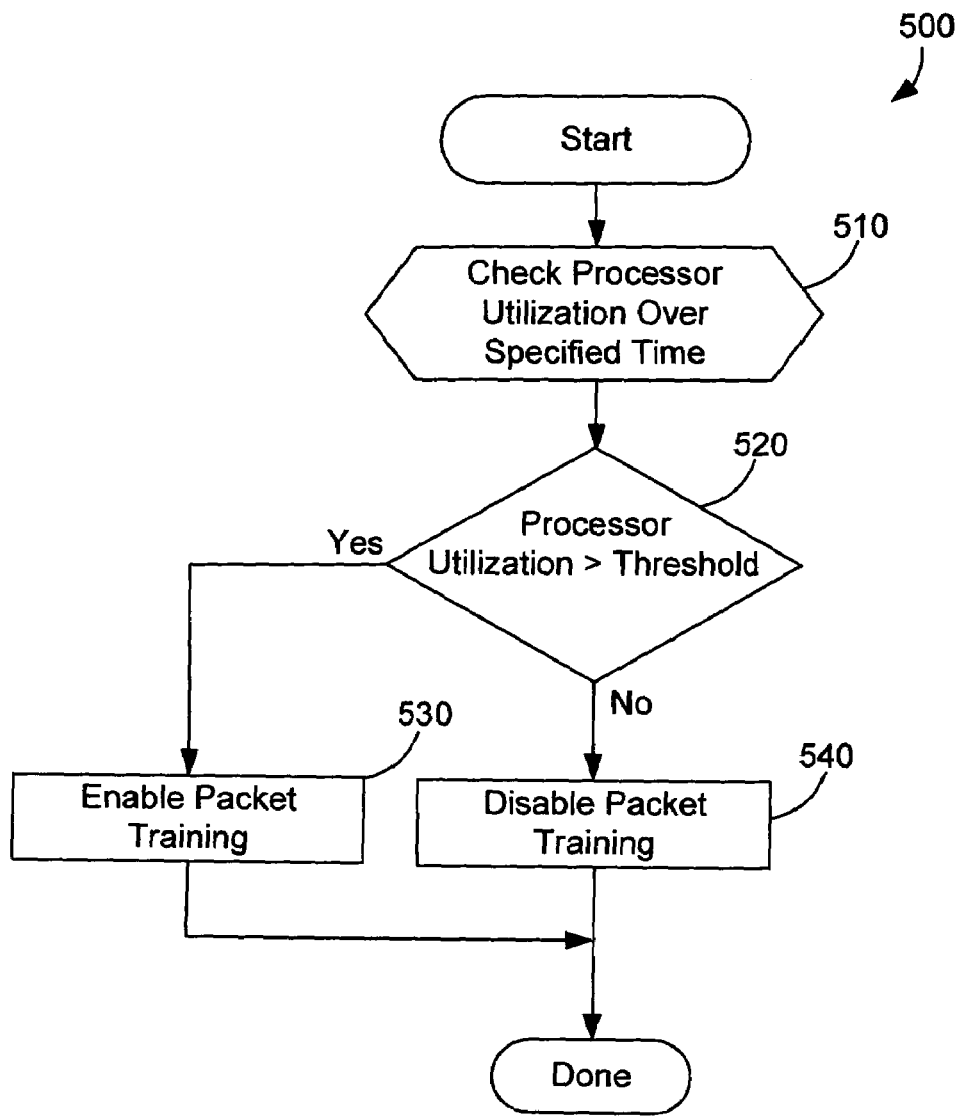
FIG. 5 illustrates a method in accordance with a preferred embodiment.

FIG. 5 shows a method 500 of adjusting the packet compression or packet training according to a preferred embodiment. The method 500 starts periodically to check the processor utilization (step 510). The method may be started by a timer interrupt or some other suitable means to insure the method runs with a suitable period. If the processor utilization is greater than a set threshold (step 540=yes), then the packet training is enabled (step 530). If the processor utilization is less than or equal to a set threshold (step 520=no) then the packet training is disabled (step 540). The threshold utilization percentage can be a parameter stored in memory that can be adjusted by a suitable software interface to the packet control mechanism 124 (FIG. 1).

Figure 6:
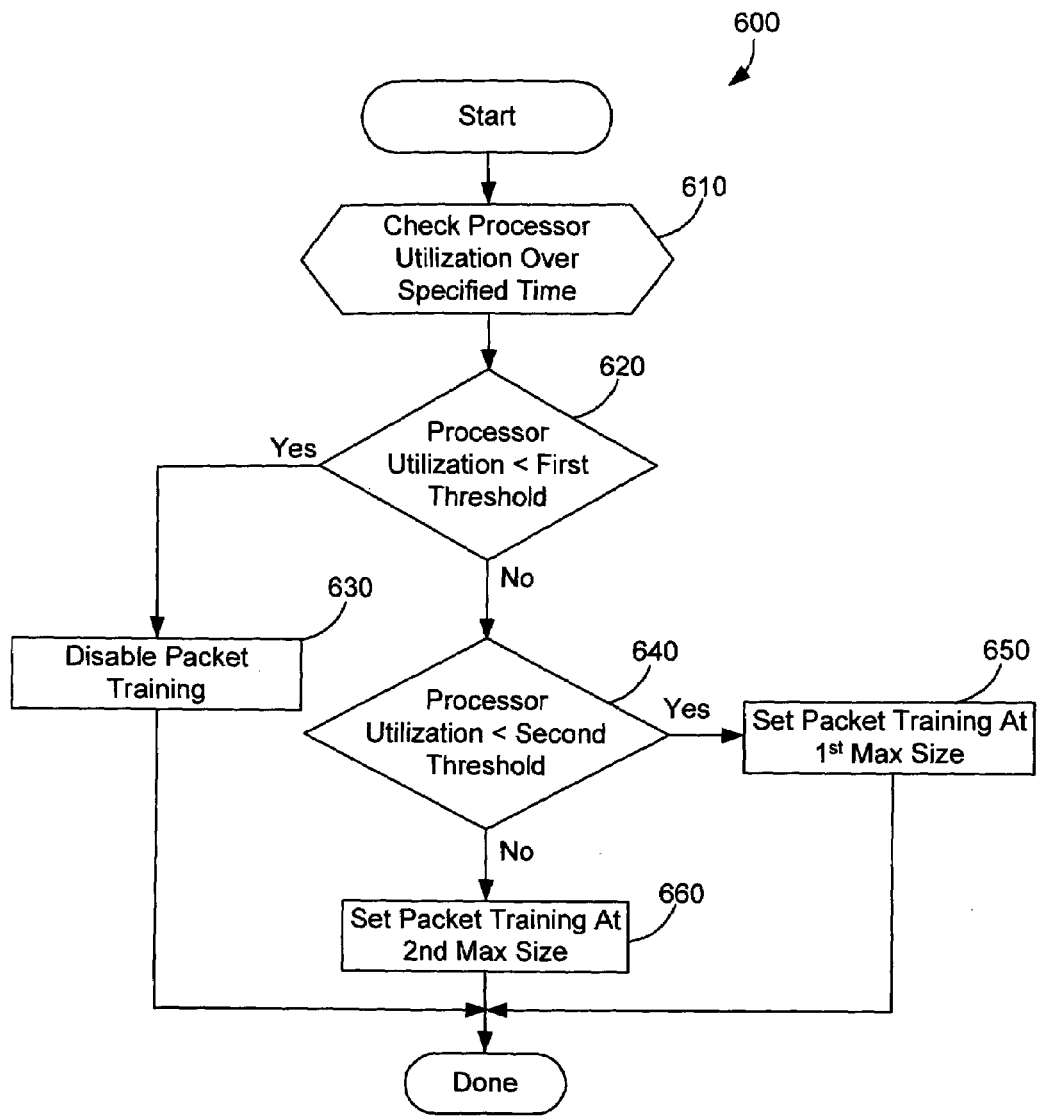
FIG. 6 illustrates a method in accordance with another preferred embodiment.

FIG. 6 shows another method 600 of adjusting the packet compression or packet training according to a preferred embodiment. The method 600 starts periodically to check the processor utilization (step 610). The method may be started as described above. If the processor utilization is less than a first set threshold (step 620=yes), then the packet training is disabled (step 630). If the processor utilization is greater than or equal to the first set threshold (step 620=no) then the method continues with step 640. If the processor utilization is less than a second set threshold (step 640=yes) then the maximum packet training is set to a first level (step 650). If the processor utilization is greater than or equal to the second set threshold (step 640=no) then the maximum packet training is set to a second level (step 660). The threshold utilization can be a parameter stored in memory that can be adjusted by a suitable software interface to the packet control mechanism 124 (FIG. 1). Similarly, other embodiments could include additional thresholds and corresponding maximum levels of packet training.

As described above, there is a tradeoff between CPU load and communication latency when using packet training. Packet training decreases the load on the CPU but may increase the delay for a message to be sent over the network due to the delay in building a train of packets. The present invention provides the computer industry with an improved way to optimize the tradeoff between CPU loading and network latency to improve overall performance in a packet data network.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer implemented method for sending a plurality of data packets in a packet train over a network, the method comprising the steps of:
   determining load on a processor using an API call;
   dynamically adjusting packet training on the network depending on the load on the processor wherein the adjusting comprises:
   a) comparing the load on the processor to a plurality of predetermined thresholds;
   b) if the load of the processor is less than a first of the plurality of thresholds, then disabling the packet training;
   c) if the load of the processor is greater than or equal to a second threshold, then setting a maximum size of a packet train depending on a corresponding predetermined threshold, wherein the predetermined threshold is set by a user of a computer system that includes the processor.

* * * * *